US008112355B1

(12) United States Patent
Lam et al.

(10) Patent No.: US 8,112,355 B1
(45) Date of Patent: Feb. 7, 2012

(54) METHOD AND SYSTEM FOR BUYER CENTRIC DISPUTE RESOLUTION IN ELECTRONIC PAYMENT SYSTEM

(75) Inventors: Duc Lam, San Jose, CA (US); Celeste Wyman, San Francisco, CA (US); Xuan McRae, Fremont, CA (US)

(73) Assignee: JPMorgan Chase Bank, N.A., New York, NY (US)

( * ) Notice: Subject to any disclaimer, the term of this patent is extended or adjusted under 35 U.S.C. 154(b) by 643 days.

(21) Appl. No.: 12/205,835

(22) Filed: Sep. 5, 2008

(51) Int. Cl.
*G06Q 40/00* (2006.01)

(52) U.S. Cl. .................. 705/40; 705/1; 705/34; 705/39

(58) Field of Classification Search .................. None
See application file for complete search history.

(56) References Cited

U.S. PATENT DOCUMENTS

| | | | |
|---|---|---|---|
| 3,653,480 | A | 4/1972 | Yamamoto et al. |
| 4,205,780 | A | 6/1980 | Burns |
| 4,264,808 | A | 4/1981 | Owens et al. |
| 4,321,672 | A | 3/1982 | Braun et al. |
| 4,396,985 | A | 8/1983 | Ohara |
| 4,495,018 | A | 1/1985 | Vohrer |
| 4,617,457 | A | 10/1986 | Myers |
| 4,672,377 | A | 6/1987 | Murphy |
| 4,700,055 | A | 10/1987 | Kashkashian, Jr. |
| 4,752,877 | A | 6/1988 | Roberts et al. |
| 4,797,913 | A | 1/1989 | Kaplan |
| 4,799,156 | A | 1/1989 | Shavit |
| 4,812,628 | A | 3/1989 | Boston |
| 4,823,264 | A | 4/1989 | Deming |
| 4,931,793 | A | 6/1990 | Fuhrmann et al. |
| 4,948,174 | A | 8/1990 | Thomson et al. |
| 4,974,878 | A | 12/1990 | Josephson |

(Continued)

FOREIGN PATENT DOCUMENTS

EP        0421808 A2    4/1991

(Continued)

OTHER PUBLICATIONS

Anonymous; Visa & Carnegie Mellon Plan Online Payment Scheme, Newsbyte News Network, Feb. 15, 1995.

(Continued)

*Primary Examiner* — M. Thein
(74) *Attorney, Agent, or Firm* — Lowenstein Sandler PC (57) ABSTRACT

A method for facilitating resolution of a dispute between a buyer and a seller in an electronic payment system is provided. An electronic payment system is also described. An invoice is received from the seller and is electronically routed to the individuals in the buyer's organization. Indications that the invoice is disputed, corrections to the invoice, comments for the seller regarding the invoice and comments for other individuals in the buyer's organization are received from a set of two or more individuals in the buyer's organization. An indication that the invoice is disputed, corrections to the invoice and comments for the seller are forwarded to the seller without forwarding the comments for other individuals in the buyer's organization. A response to the buyer's indication that the invoice is disputed is received from the seller. The response includes an acceptance of changes suggested by the buyer or an indication that the seller disputes the changes suggested by the buyer. Payment is withheld for the invoice until an indication from the buyer has been received that the buyer has determined that the invoice has been paid. The indication, corrections and comments to the seller may be forwarded to the seller in an electronic mail message.

5 Claims, 6 Drawing Sheets

U.S. PATENT DOCUMENTS

| | | |
|---|---|---|
| 4,988,849 A | 1/1991 | Sasaki |
| 4,992,646 A | 2/1991 | Collin |
| 5,023,904 A | 6/1991 | Kaplan |
| 5,053,607 A | 10/1991 | Carlson |
| 5,054,096 A | 10/1991 | Beizer |
| 5,080,748 A | 1/1992 | Bonomi |
| 5,111,395 A | 5/1992 | Smith |
| 5,121,945 A | 6/1992 | Thomson et al. |
| 5,122,950 A | 6/1992 | Mee |
| 5,136,502 A | 8/1992 | Van Remortel et al. |
| 5,175,682 A | 12/1992 | Higashiyama |
| 5,187,750 A | 2/1993 | Behera |
| 5,198,975 A | 3/1993 | Baker et al. |
| 5,225,978 A | 7/1993 | Petersen |
| 5,237,159 A | 8/1993 | Stephens |
| 5,265,007 A | 11/1993 | Barnhard, Jr. et al. |
| 5,283,829 A | 2/1994 | Anderson |
| 5,287,269 A | 2/1994 | Dorrough et al. |
| 5,311,594 A | 5/1994 | Penzias |
| 5,315,508 A | 5/1994 | Bain et al. |
| 5,321,238 A | 6/1994 | Watanabe |
| 5,326,959 A | 7/1994 | Perazza |
| 5,336,870 A | 8/1994 | Hughes |
| 5,349,170 A | 9/1994 | Kern |
| 5,350,906 A | 9/1994 | Brody et al. |
| 5,367,581 A | 11/1994 | VanHorn |
| 5,373,550 A | 12/1994 | Campbell |
| 5,396,417 A | 3/1995 | Burks |
| 5,402,474 A | 3/1995 | Miller |
| 5,412,190 A | 5/1995 | Kopesec |
| 5,424,938 A | 6/1995 | Wagner |
| 5,430,644 A | 7/1995 | Deaton et al. |
| 5,432,506 A | 7/1995 | Chapman |
| 5,444,794 A | 8/1995 | Uhland |
| 5,444,841 A | 8/1995 | Glaser et al. |
| 5,446,740 A | 8/1995 | Yien |
| 5,448,471 A | 9/1995 | Deaton et al. |
| 5,465,206 A | 11/1995 | Hilt et al. |
| 5,477,040 A | 12/1995 | Lalonde |
| 5,479,494 A | 12/1995 | Clitherow |
| 5,483,445 A | 1/1996 | Pickering |
| 5,484,988 A | 1/1996 | Hills |
| 5,502,576 A | 3/1996 | Ramsay et al. |
| 5,504,677 A | 4/1996 | Pollin |
| 5,506,691 A | 4/1996 | Bednar et al. |
| 5,508,731 A | 4/1996 | Kohorn |
| 5,513,250 A | 4/1996 | McAllister |
| 5,532,464 A | 7/1996 | Josephson et al. |
| 5,544,043 A | 8/1996 | Miki et al. |
| 5,544,046 A | 8/1996 | Niwa |
| 5,550,734 A | 8/1996 | Tater |
| 5,551,021 A | 8/1996 | Harada |
| 5,557,515 A | 9/1996 | Abbruzzese et al. |
| 5,563,400 A | 10/1996 | Le Roux |
| 5,566,330 A | 10/1996 | Sheffield |
| 5,568,489 A | 10/1996 | Yien |
| 5,570,465 A | 10/1996 | Tsakanikas |
| 5,572,004 A | 11/1996 | Raimann |
| 5,583,759 A | 12/1996 | Geer |
| 5,583,760 A | 12/1996 | Klesse |
| 5,590,196 A | 12/1996 | Moreau |
| 5,592,377 A | 1/1997 | Lipkin |
| 5,592,378 A | 1/1997 | Cameron |
| 5,599,528 A | 2/1997 | Igaki |
| 5,603,025 A | 2/1997 | Tabb |
| 5,615,109 A | 3/1997 | Eder |
| 5,621,201 A | 4/1997 | Langhans |
| 5,640,577 A | 6/1997 | Scharmer |
| 5,642,419 A | 6/1997 | Rosen |
| 5,649,117 A | 7/1997 | Landry |
| 5,652,786 A | 7/1997 | Rogers |
| 5,659,165 A | 8/1997 | Jennings |
| 5,659,469 A | 8/1997 | Deaton et al. |
| 5,659,741 A | 8/1997 | Eberhardt |
| 5,666,493 A | 9/1997 | Wojcik et al. |
| 5,677,955 A | 10/1997 | Doggett et al. |
| 5,679,938 A | 10/1997 | Templeton |
| 5,679,940 A | 10/1997 | Templeton |
| 5,687,250 A | 11/1997 | Curley et al. |
| 5,692,132 A | 11/1997 | Hogan |
| 5,699,528 A | 12/1997 | Hogan |
| 5,703,344 A | 12/1997 | Bezy et al. |
| 5,704,044 A | 12/1997 | Tarter et al. |
| 5,708,422 A | 1/1998 | Blonder et al. |
| 5,715,298 A | 2/1998 | Rogers |
| 5,715,314 A | 2/1998 | Payne |
| 5,715,399 A | 2/1998 | Bezos |
| 5,717,989 A | 2/1998 | Tozzoli et al. |
| 5,724,424 A | 3/1998 | Gifford |
| 5,727,249 A | 3/1998 | Powell |
| 5,748,780 A | 5/1998 | Stolfo |
| 5,751,842 A | 5/1998 | Eccles |
| 5,757,917 A | 5/1998 | Rose et al. |
| 5,770,843 A | 6/1998 | Rose et al. |
| 5,774,553 A | 6/1998 | Rosen |
| 5,784,696 A | 7/1998 | Melnikof |
| 5,793,861 A | 8/1998 | Haigh |
| 5,794,221 A | 8/1998 | Egendorf |
| 5,802,498 A | 9/1998 | Comesanas |
| 5,802,499 A | 9/1998 | Sampson et al. |
| 5,819,238 A | 10/1998 | Fernholz |
| 5,826,241 A | 10/1998 | Stein |
| 5,826,245 A | 10/1998 | Sandberg-Diment |
| 5,832,447 A | 11/1998 | Rieker |
| 5,832,460 A | 11/1998 | Bednar |
| 5,832,463 A | 11/1998 | Houvener et al. |
| 5,832,464 A | 11/1998 | Houvener et al. |
| 5,832,488 A | 11/1998 | Eberhardt |
| 5,835,580 A | 11/1998 | Fraser |
| 5,835,603 A | 11/1998 | Coutts |
| 5,835,899 A | 11/1998 | Rose et al. |
| 5,852,812 A | 12/1998 | Reeder |
| 5,859,419 A | 1/1999 | Wynn |
| 5,864,609 A | 1/1999 | Cross et al. |
| 5,870,456 A | 2/1999 | Rogers |
| 5,870,721 A | 2/1999 | Norris |
| 5,870,723 A | 2/1999 | Pare |
| 5,870,725 A | 2/1999 | Bellinger et al. |
| 5,873,072 A | 2/1999 | Kight |
| 5,884,288 A | 3/1999 | Chang |
| 5,897,625 A | 4/1999 | Gustin |
| 5,898,157 A | 4/1999 | Mangili et al. |
| 5,903,881 A | 5/1999 | Schrader |
| 5,910,896 A | 6/1999 | Hahn-Carlson |
| 5,910,988 A | 6/1999 | Ballard |
| 5,917,965 A | 6/1999 | Cahill et al. |
| 5,920,847 A | 7/1999 | Kolling et al. |
| 5,930,778 A | 7/1999 | Geer |
| 5,940,811 A | 8/1999 | Norris |
| 5,940,844 A | 8/1999 | Cahill et al. |
| 5,943,656 A | 8/1999 | Crooks |
| 5,945,653 A | 8/1999 | Walker et al. |
| 5,956,700 A | 9/1999 | Landry |
| 5,963,659 A | 10/1999 | Cahill et al. |
| 5,963,925 A | 10/1999 | Kolling et al. |
| 5,966,698 A | 10/1999 | Pollin |
| 5,978,780 A | 11/1999 | Watson |
| 5,987,435 A | 11/1999 | Weiss et al. |
| 5,987,436 A | 11/1999 | Halbrook |
| 5,987,439 A | 11/1999 | Gustin et al. |
| 5,991,750 A | 11/1999 | Craig |
| 6,000,832 A | 12/1999 | Franklin et al. |
| 6,003,762 A | 12/1999 | Hayashida |
| 6,006,208 A | 12/1999 | Forst et al. |
| 6,009,442 A | 12/1999 | Chen et al. |
| 6,014,636 A | 1/2000 | Reeder |
| 6,016,482 A | 1/2000 | Molinari et al. |
| 6,016,484 A | 1/2000 | Williams et al. |
| 6,026,388 A | 2/2000 | Liddy et al. |
| 6,029,139 A | 2/2000 | Cunningham et al. |
| 6,032,133 A | 2/2000 | Hilt et al. |
| 6,032,137 A | 2/2000 | Hallard |
| 6,035,281 A | 3/2000 | Crosskey et al. |
| 6,035,285 A | 3/2000 | Schlect et al. |
| 6,035,287 A | 3/2000 | Stallaert et al. |
| 6,038,553 A | 3/2000 | Hyde, Jr. |
| 6,041,312 A | 3/2000 | Bickerton et al. |

| | | |
|---|---|---|
| 6,041,315 A | 3/2000 | Pollin |
| 6,044,362 A | 3/2000 | Neely |
| 6,052,674 A | 4/2000 | Zervides et al. |
| 6,058,380 A | 5/2000 | Anderson et al. |
| 6,058,381 A | 5/2000 | Nelson |
| 6,061,665 A | 5/2000 | Bahreman |
| 6,064,764 A | 5/2000 | Bhaskaran et al. |
| 6,065,675 A | 5/2000 | Teicher |
| 6,067,524 A | 5/2000 | Byerly et al. |
| 6,070,150 A | 5/2000 | Remington et al. |
| 6,070,798 A | 6/2000 | Nethery |
| 6,073,104 A | 6/2000 | Field |
| 6,073,113 A | 6/2000 | Guinan |
| 6,076,072 A | 6/2000 | Libman |
| 6,078,907 A | 6/2000 | Lamm |
| 6,081,790 A | 6/2000 | Rosen |
| 6,085,168 A | 7/2000 | Mori et al. |
| 6,088,683 A | 7/2000 | Jalili |
| 6,088,685 A | 7/2000 | Kiron et al. |
| 6,088,686 A | 7/2000 | Walker et al. |
| 6,092,056 A | 7/2000 | Tull, Jr. et al. |
| 6,098,053 A | 8/2000 | Slater |
| 6,098,070 A | 8/2000 | Maxwell |
| 6,105,011 A | 8/2000 | Morrison, Jr. |
| 6,108,639 A | 8/2000 | Walker et al. |
| 6,110,044 A | 8/2000 | Stern |
| 6,111,858 A | 8/2000 | Greaves et al. |
| 6,115,690 A | 9/2000 | Wong |
| 6,119,106 A | 9/2000 | Mersky et al. |
| 6,119,107 A | 9/2000 | Polk |
| 6,125,354 A | 9/2000 | MacFarlane et al. |
| 6,128,602 A | 10/2000 | Northington et al. |
| 6,128,603 A | 10/2000 | Dent et al. |
| 6,129,273 A | 10/2000 | Shah |
| 6,138,118 A | 10/2000 | Koppstein et al. |
| 6,144,946 A | 11/2000 | Iwamura |
| 6,148,293 A | 11/2000 | King |
| 6,149,056 A | 11/2000 | Stinson et al. |
| 6,173,272 B1 | 1/2001 | Thomas et al. |
| 6,181,837 B1 | 1/2001 | Cahill et al. |
| 6,185,544 B1 | 2/2001 | Sakamoto et al. |
| 6,202,054 B1 | 3/2001 | Lawlor et al. |
| 6,205,433 B1 | 3/2001 | Boesch et al. |
| 6,227,447 B1 | 5/2001 | Campisano |
| 6,233,566 B1 | 5/2001 | Levine et al. |
| 6,236,972 B1 | 5/2001 | Shkedy |
| 6,240,444 B1 | 5/2001 | Fin et al. |
| 6,278,981 B1 | 8/2001 | Dembo et al. |
| 6,289,322 B1 | 9/2001 | Kitchen et al. |
| 6,292,789 B1 | 9/2001 | Schutzer |
| 6,301,379 B1 | 10/2001 | Thompson et al. |
| 6,304,858 B1 | 10/2001 | Mosler et al. |
| 6,321,212 B1 | 11/2001 | Lange |
| 6,324,524 B1 | 11/2001 | Lent et al. |
| 6,338,047 B1 | 1/2002 | Wallman |
| 6,338,049 B1 | 1/2002 | Walker et al. |
| 6,374,235 B1 | 4/2002 | Chen et al. |
| 6,393,409 B2 | 5/2002 | Young et al. |
| 6,405,173 B1 | 6/2002 | Honarvar et al. |
| 6,415,259 B1 | 7/2002 | Wolfinger et al. |
| 6,418,419 B1 | 7/2002 | Nieboer et al. |
| 6,418,420 B1 | 7/2002 | DiGiorgio et al. |
| 6,418,430 B1 | 7/2002 | DeFazio et al. |
| 6,446,072 B1 | 9/2002 | Schulze et al. |
| 6,490,568 B1 | 12/2002 | Omara et al. |
| 6,493,685 B1 | 12/2002 | Ensel et al. |
| 6,535,896 B2 | 3/2003 | Britton et al. |
| 6,574,350 B1 | 6/2003 | Rhoads et al. |
| 6,574,377 B1 | 6/2003 | Cahill et al. |
| 6,578,000 B1 | 6/2003 | Dodrill et al. |
| 6,578,015 B1 | 6/2003 | Haseltine et al. |
| 6,609,113 B1 | 8/2003 | O'Leary et al. |
| 6,609,125 B1 | 8/2003 | Layne et al. |
| 6,629,081 B1 | 9/2003 | Cornelius et al. |
| 6,636,615 B1 | 10/2003 | Rhoads et al. |
| 6,704,714 B1 | 3/2004 | O'Leary et al. |
| 6,721,715 B2 | 4/2004 | Nemzow |
| 6,825,940 B1 | 11/2004 | Wu et al. |
| 6,954,896 B1 | 10/2005 | Dodrill et al. |
| 6,968,319 B1 * | 11/2005 | Remington et al. ............ 705/40 |
| 6,970,259 B1 | 11/2005 | Lunt et al. |
| 7,062,456 B1 | 6/2006 | Riehl et al. |
| 7,104,443 B1 | 9/2006 | Paul et al. |
| 7,177,836 B1 | 2/2007 | German et al. |
| 2001/0018739 A1 | 8/2001 | Anderson et al. |
| 2001/0032139 A1 | 10/2001 | Debonnett, Jr. |
| 2001/0037309 A1 | 11/2001 | St. Vrain |
| 2001/0047334 A1 | 11/2001 | Nappe et al. |
| 2001/0047489 A1 | 11/2001 | Ito et al. |
| 2002/0010591 A1 * | 1/2002 | Pomerance ....................... 705/1 |
| 2002/0012445 A1 | 1/2002 | Perry |
| 2002/0013728 A1 | 1/2002 | Wilkman |
| 2002/0023055 A1 | 2/2002 | Antognini et al. |
| 2002/0026394 A1 | 2/2002 | Savage et al. |
| 2002/0038363 A1 | 3/2002 | MacLean |
| 2002/0052842 A1 | 5/2002 | Schuba et al. |
| 2002/0055907 A1 | 5/2002 | Pater et al. |
| 2002/0069134 A1 | 6/2002 | Solomon |
| 2002/0072976 A1 | 6/2002 | Virtanen et al. |
| 2002/0077978 A1 | 6/2002 | O'Leary et al. |
| 2002/0087468 A1 | 7/2002 | Ganesan et al. |
| 2002/0087469 A1 | 7/2002 | Ganesan et al. |
| 2002/0091635 A1 | 7/2002 | Dilip et al. |
| 2002/0107770 A1 | 8/2002 | Meyer et al. |
| 2002/0107788 A1 | 8/2002 | Cunningham |
| 2002/0111837 A1 | 8/2002 | Aupperle |
| 2002/0138398 A1 | 9/2002 | Kalin et al. |
| 2002/0170966 A1 | 11/2002 | Hannigan et al. |
| 2002/0178071 A1 | 11/2002 | Walker et al. |
| 2002/0184151 A1 | 12/2002 | Maloney |
| 2002/0194096 A1 | 12/2002 | Falcone et al. |
| 2002/0198817 A1 | 12/2002 | Dhir |
| 2002/0199182 A1 | 12/2002 | Whitehead |
| 2003/0018557 A1 | 1/2003 | Gilbert et al. |
| 2003/0037002 A1 | 2/2003 | Higgins et al. |
| 2003/0046218 A1 | 3/2003 | Albanese et al. |
| 2003/0097335 A1 | 5/2003 | Muskowitz et al. |
| 2003/0105641 A1 | 6/2003 | Lewis |
| 2003/0110442 A1 | 6/2003 | Battle |
| 2003/0120686 A1 | 6/2003 | Kim et al. |
| 2003/0187789 A1 | 10/2003 | Karas et al. |
| 2003/0191710 A1 | 10/2003 | Green et al. |
| 2003/0208421 A1 | 11/2003 | Vicknair et al. |
| 2003/0208441 A1 | 11/2003 | Poplawski et al. |
| 2003/0225663 A1 | 12/2003 | Horan et al. |
| 2003/0233305 A1 | 12/2003 | Solomon |
| 2003/0237046 A1 | 12/2003 | Parker et al. |
| 2004/0064409 A1 | 4/2004 | Kight et al. |
| 2004/0078328 A1 | 4/2004 | Talbert et al. |
| 2004/0201735 A1 | 10/2004 | Baron |
| 2004/0228514 A1 | 11/2004 | Houle et al. |
| 2005/0033690 A1 | 2/2005 | Antognini et al. |
| 2005/0177480 A1 | 8/2005 | Huang |

FOREIGN PATENT DOCUMENTS

| | | |
|---|---|---|
| EP | 1014318 A2 | 6/2000 |
| WO | WO 91/16691 A1 | 10/1991 |
| WO | WO 93/08545 A1 | 4/1993 |
| WO | WO 94/28497 A1 | 12/1994 |
| WO | WO 96/08783 A1 | 3/1996 |
| WO | WO 96/12242 A1 | 4/1996 |
| WO | WO 97/14108 A1 | 4/1997 |
| WO | WO 97/45796 A1 | 12/1997 |
| WO | WO 97/45814 A1 | 12/1997 |
| WO | WO 98/09260 A1 | 3/1998 |
| WO | WO 99/10823 A1 | 3/1999 |
| WO | WO 00/39979 A1 | 7/2000 |
| WO | WO 01/75730 A2 | 10/2001 |
| WO | WO 02/063432 A2 | 8/2002 |
| WO | WO 2004/079603 A1 | 9/2004 |

OTHER PUBLICATIONS

Goode; On Profit, Loss and the Mysteries of the Mind, The New York Times, Nov. 5, 2002.

Fidelity Helps Fund Sellers Trim the Taxes They'll Owe, The Wall Street Journal, Nov. 7, 2002.

Zuckerman; The Hedge-Fund Craze, The Wall Street Journal, Jun. 12, 2002.

Harsh Truth: Your Investments Likely Won't Make Any Money.
McDonald; The Stars in the Sky Flicker, and Fund Stars Do the Same, The Wall Street Journal, Jan. 15, 2003.
Maher and Troutman; Provider's Prescription for Painless Migration to Receipt of Electronic Healthcare Payments and Remittance Advices, PNC Bank, Dec. 2001.
Maher and Troutman; Payor's Prescription for Painless Migration to Electronic Healthcare Payments and Remittance Advices, PNC Bank, Dec. 2001.
CES/Nabanco Introduces Stored Value Card Technology Blockbuster Video Is First Merchant Partner, Business Wire, Inc., Jan. 15, 1996.
First Data Markets Stored-Value Cards, Cards International, Jan. 30, 1996, p. 5.
Norris; First Data Unit Develops Blockbuster Cash Card, Omaha World Hearld Sunrise Edition, Business Section, Jan. 19, 1996, p. 16.
Blockbuster Running Test of a Stored Value Card, The American Banker, Sep. 1, 1995.
Financial News; Wells Fargo Rolls Out Nationwide Lockbox Check Conversion, PR Newswire Association, Apr. 22, 2003.
Malhotra; Clearing House Enumerates E-Payments Ills, The American Banker, vol, 167, No. 154, Aug. 13, 2002.
Card Flash Daily Payment Card News, www.Cardweb.com, Printed Sep. 23, 2004.
Nokia Announces the World's First NFC Enabled Mobile Product for Contactless Payment and Ticketing, PRNewswire, Feb. 9, 2005.
Annual Report Pursuant to Section 13 or 15(D) of the Securities Exchange Act of 1934, Form 10-K, Intelidata Technologies Corporation, Fiscal Year Ended Dec. 31, 2001.
Technology, in Brief Wachovia-Intelidata Deal, May 7, 2002.
French; Tech Stocks: Market Movers, Investors Worry Checkfree Being Chased From Its Own Game, http://www.Thestreet.com, Jun. 20, 2002.
Money, Initial Launch to 200 Credit Unions, USA Today.com, Jun. 27, 2002.
Bills; Chase Pact Done, What's Next for Web Vendors?, The American Banker, Technology Section, Jun. 3, 2002, p. 23.

Anonymous; Chase Manhattan Introduces New FEDI Payables Product, Proquest Document ID: 7806951, ISSN/ISBN: 02686635, May 1995.
Marjanovic; Corporate Services: Chase Gears Up Global Payments System Series: 16, The American Banker, vol. 160, Issue 174, Sep. 11, 1995, p. 41.
Anonymous; Operating in a Multi-Currency Environment, Proquest Document ID 9215937, ISSN/ISBN 09589309, Oct. 1995.
Reinbach; Chase Steps Up Treasury System, Proquest Documednt ID 8723558, ISSN/ISBN: 10459472, Nov. 1995.
Anonymous; Chasing the Global Trend, Cash Management News, Proquest Document ID 9319923, ISSN/ISBN: 02686635, Dec. 1995.
Gluck; Creating a Global Cash-Management Game Plan, Bank Systems & Technology, Feb. 1997, p. 28.
Anonymous; Systems Spell Change for Foreign Exchange, Global Investor, Proquest Document ID 1056152B, ISSN/ISBN: 09513604, Nov. 1996.
Decovny; Net Scope, Banking Technology, May 1997.
Press Release, March 5, 2004, Payment Data Systems Files Patent on Debit Card Payment Solution, American City Business Journals, Inc., Mar. 5, 2004.
Lamond; Credit Card Transactions Real World and Online, Paying by Credit Card-Real World and Online, http://www.virtualschool.edu/mon/electronicproperty/klamond/credit, Printed Jul. 8, 2005, 17 pages.
Carreker; Electronic Check Presentment: Capturing New Technology, http://proquest.uni.com, Banking Management, Rolling Meadows: vol. 71, Issue 2, Mar./Apr. 1995, p. 32, 5 pages.
Du Pont's Electronic Payments, Corporate EFT Report, V9, N1, Dialog File 636, Accession No. 01066902, Jan. 11, 1989.
Dialog File 20, #10279554; Offer: Book Yourself Free Cassettes; Mar. 25, 2000; Birmingham Post, p. 16.
Terrie Miller and Henry Yan; When Custody Governs, Benefits Canada, Toronto, Feb. 1998, vol. 22, Issue 2, p. 33, 5 Pages.

* cited by examiner

301 — Tabs: Tasklist (305) | Invoices (306) | Disbursements (307) | Analysis (308) | Suppliers (309) | Preferences (310)

Sub-tabs (311): Pending Approval (312) | Exceptions (313) | Disputed (314) | Approved (315) | PO Status | Reports (316)

317 — Distribution Item Status: ALL

302 — Invoice No: 22222222  [audit] (353)

Yellow items indicate that you were assigned this invoice through routing. All other have been assigned by workgroup.

303 —

| Supplier (318) | PO # (319) | Invoice Date (320) | Due Date (321) | Amount (322) | Cost Center (323) | Owner (324) | Action(s) (325) | Status (326) |
|---|---|---|---|---|---|---|---|---|
| Blue River | 565655 | Sep 18, 2001 | Sep 16, 2001 | $89078.87 | 100 | Marilyn Monroe | ☑ ☒ (327, 328) | ↑ (329) |

304 — Distribution Items

| | Line # (331) | PO Line # (332) | Distrib # (333) | Part # (334) | Description (335) | Unit Price (336) | Line Tax (337) | Distrib Quantity (338) | Distrib Amount (339) | Action(s) (340) | Status (341) |
|---|---|---|---|---|---|---|---|---|---|---|---|
| 342 ☑ | 1 | 4 | 1 | 897897Q | AAA DVD Player | $300.65 | | 4 | $1202.60 | ☑ ☒ | |
| 343 ☑ | 2 | 6 | 1 | JKL7788 | BBB Firewire Hard Drive | $23.84 | | 1 | $23.84 | ☑ ☒ | |
| 344 ☑ | 3 | 4 | 1 | LUJHG | BJC2100 Acme Color Bubble Jet | $23.23 | | 1 | $20000.00 | ☑ ☒ | |
| 345 ☑ | 4 | 12 | 1 | pQ798 | NNN SW Professional Edition | $234.87 | | 1 | $14719.00 | ☑ ☒ | |

Select All (346) | De-Select All (347) | On Selected ☑ ☒ (348)

349 — Freight: $213.99
350 — Tax: $50.00
351 — Total: $6013.50

METHOD AND SYSTEM FOR BUYER CENTRIC DISPUTE RESOLUTION IN ELECTRONIC PAYMENT SYSTEM

CROSS-REFERENCE TO RELATED APPLICATIONS

This application is a divisional application of U.S. patent application Ser. No. 10/155,866, filed May 24, 2002, which is related to the following United States patent applications filed on even date therewith:

Method and System for Collaborative Vendor Reconciliation, application Ser. No. 10/155,797;

System and Method for Electronic Authorization of Batch Checks, application Ser. No. 10/155,800;

System and Method for Varying Electronic Settlements between Buyers and Suppliers with Dynamic Discount Terms, application Ser. No. 10/155,806;

System and Method for Electronic Payer (Buyer) Defined Invoice Exchange, application Ser. No. 10/155,840; and Method and System for invoice Routing and Approval in Electronic Payment System, application Ser. No. 10/155,853.

All of the foregoing applications are incorporated herein by reference in their entirety.

BACKGROUND OF THE INVENTION

1. Field of the Invention

This invention relates to the field of software and computer network systems. In particular, the invention relates to electronic systems associated with financial transactions.

2. Description of the Related Art

In traditional paper payment systems, an organization or an individual initiates payment by sending a physical check to the party to whom a debt is owed. The check may be sent in response to an invoice from the party to whom the debt is owed. A newer approach is electronic payment. For example, in the consumer context, individuals may be able to make payment by way of electronic banking. Payment instructions are sent electronically from the individual's computer system to the individual's bank. Payment is then effected by the bank.

Numerous systems now exist relating to accounting and bill payment. For example, computer software is used to track invoices and print payment checks. Payments may be made by wire transfer, with instructions requesting funds of the payer in one financial institution to be transferred to an account of the party to whom payment is to be effected.

Enterprise resource planning (ERP) systems are used for managing the purchases of goods and services. Such systems may have databases of complex and extensive sets of information, such as addresses of various suppliers and similar information related to purchasing. Sellers also use electronic accounting and record keeping systems which may assist in the receipt and tracking receipt of payment for goods and services. Prior systems require considerable amounts of effort to update and maintain, and may lack compatibility with the systems used by parties with whom an organization wishes to engage in transactions. There is thus a need for improved systems to facilitate transactions between buyers and sellers.

SUMMARY OF THE INVENTION

An embodiment of the invention is directed to a method of facilitating resolution of a dispute between a buyer and a seller in an electronic payment system. An invoice is received from the seller and is electronically routed to individuals in the buyer's organization. Indications that the invoice is disputed, corrections to the invoice, comments for the seller regarding the invoice and comments for other individuals in the buyer's organization are received from a set of two or more individuals in the buyer's organization. An indication that the invoice is disputed, corrections to the invoice and comments for the seller are forwarded to the seller without forwarding the comments for other individuals in the buyer's organization. Response to the buyer's indication that the invoice is disputed is received from the seller. The response includes an acceptance of changes suggested by the buyer or an indication that the seller disputes the changes suggested by the buyer. Payment is withheld for the invoice until an indication from the buyer has been received that the buyer has determined that the invoice has been paid. The indication, corrections and comments to the seller may be forwarded to the seller in an electronic mail message.

According to one implementation, the indication from the buyer that the buyer has determined that invoice may be paid includes information indicating that payment shall be different from that requested by the seller in the seller's response. According to another implementation, the indication from the buyer that the buyer has determined that the invoice may be paid includes an indication indicating that payment shall be that payment which is requested by the seller in the seller's response. Additionally, according to another implementation, instructions are received from the buyer to make payment for a portion of the invoice that is not disputed by the buyer and, in response, payment is made for the portion of the invoice and not for at least one other portion of the invoice that is not disputed.

According to another embodiment of the invention, a correction memo is generated automatically in response to an instruction from the buyer to end the dispute. An approval of the invoice may be received by at least one individual in the buyer's organization before receiving the indications form individuals in the buyer's organization that the invoice is disputed. Forwarding to the seller does not include informing the seller of the particular individuals that provided indications that the invoice is disputed, according to one embodiment of the invention.

According to another embodiment of the invention, a code identifying the reason for the dispute is forwarded to the seller. The code may include, according to different implementations, the following or sub or super-combinations of the following:

that the price exceeds the order;
that the quantity exceeds the order;
that the tax is not applicable;
that a respective item was not ordered;
or that the goods ordered are unsatisfactory.

According to one implementation, a history of the dispute is displayed to individuals in the respective organizations. According to one embodiment a history of the dispute is shown to individuals of the buyer's organization and, according to another embodiment, a history of the dispute is displayed to individuals in the seller's organization. According to another implementation, a history of the dispute is shown to individuals in both organizations. In such displays to the individuals in the respective organizations, different portions of the history of the dispute may be shown. For example, internal comments may be shown only to individuals in the respective organization for whom they are intended. Additionally, information regarding which particular individuals made comments or have disputed particular items may be hidden from the other respective organization. The history may include items such as an indication of users who entered dispute data, the date or time that the dispute data was entered and the date or time the dispute was sent or received.

According to one embodiment of the invention, information or aspects of the dispute are automatically forwarded to other individuals in the respective organization depending on particular conditions. According to one implementation, information regarding the dispute is forwarded to another individual if the individual responsible for responding to a notice regarding the dispute has not responded within a particular time. For example, if an individual has not responded within a certain number of days, such as one day, two days, three days or a week, in different implementations of the invention, the information regarding the dispute is forwarded to another individual in that individual's organization. Such individual may be selected as a manager of the respective individual who is responsible for responding to the notice. The manager of the individual may be determined by an organizational hierarchy of the respective organization. Such organizational hierarchy may be available according to one implementation of the invention by uploading a human resource management systems (HRMS) database and automatically forwarding to the respective manager of the respective individual based on such HRMS data.

Another embodiment of the invention is directed to an electronic payment system. The electronic payment system includes a server associated with the buyer, a server associated with the seller and logic that withholds payment for the invoice until an indication from the buyer has been received that the buyer has determined that the invoice may be paid. The server associated with the buyer includes logic that receives an electronic invoice from the seller and logic that electronically routes the invoice to individuals in the buyer's organization. The server associated with the buyer also includes logic that receives from a set of two or more individuals in the buyer's organization indications that the invoice is disputed, corrections to disputed portions of the invoice, comments for the seller regarding the disputed portions of the invoice and comments for other individuals in the buyer's organization regarding the invoice. The server associated with the seller also includes logic that forwards to a server associated with the seller an indication that the invoice is disputed, the corrections to the disputed portions of the invoice and the comments for the seller, without forwarding the comments for the other individuals in the buyer's organization.

The server associated with the seller includes logic that receives the indication, the corrections and comments from the server associated with the buyer. The server associated with the seller also includes logic that receives a response from the seller. The response includes an acceptance of the changes suggested by the buyer or an indication that the seller disputes the changes suggested by the buyer. The server associated with the seller also includes logic that forwards a response from the server associated with the seller to the server associated with the buyer.

DETAILED DESCRIPTION

An embodiment of the invention is directed to an electronic payment system with the capability to facilitate resolution disputes between a buyer and a seller. The buyer receives an electronic invoice from the seller and can electronically indicate that the invoice or portions of the invoice are disputed. The invoice is routed to various individuals in the buyer's organization, and these individuals can separately enter information regarding the invoice and the dispute of the invoice. Information from these individuals regarding the dispute is forwarded to the seller. The seller can then respond. The buyer is in control of payment and makes payment when the buyer has decided the outcome of the dispute.

Figure 1:
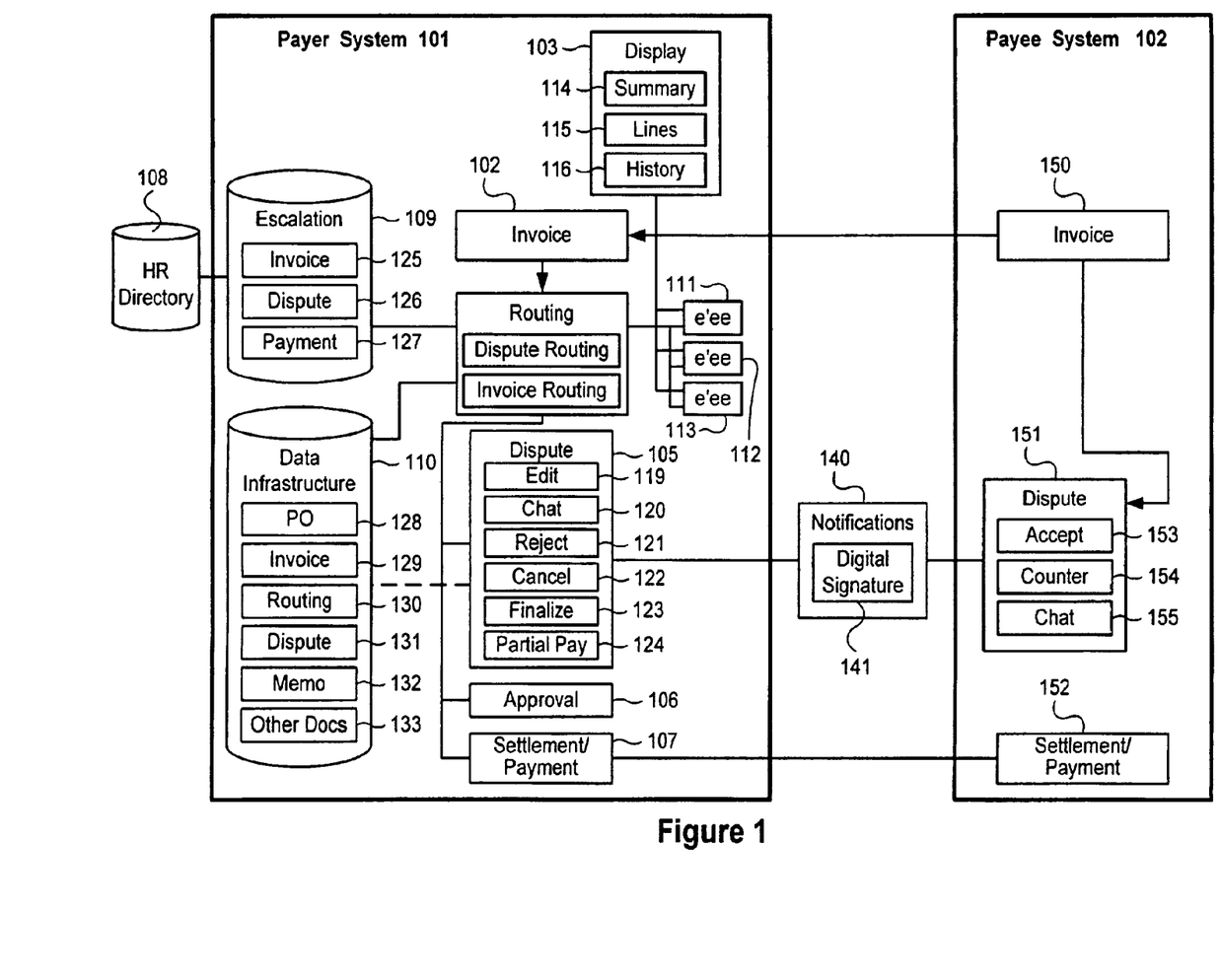
FIG. 1 is a block diagram of an electronic payment system with dispute resolution logic according to an embodiment of the invention.

FIG. 1 is a block diagram of an electronic payment system with dispute resolution logic according to an embodiment of the invention. FIG. 1 includes a payer system 101, and payee system 102, HR directory 108 and notifications 140. Payer system 101 includes display 103, invoice 150, routing logic 104, dispute logic 105, approval logic 106, settlement/payment logic 107, employee communication logic 111-113, escalation data 109 and transaction data structure 110. Display includes summary 114, lines 115 and history 116. Routing logic 104 includes invoice routing logic 117 and dispute routing logic 118. Dispute logic 105 includes edit logic 119, chat logic 120, reject logic 121, cancel logic 122, finalize logic 123 and partial pay 124. Transaction data structure 110 includes purchase order 128, invoice 129, routing information 130, dispute history 131, memo 130 and other documents 133. Escalation data 109 includes invoice 125, dispute 126 and payment 127. Notifications 140 include digital signature 141. Payee system 102 includes invoice 150, dispute logic 151 and supplement/payment logic 152.

The following is a description of certain relationships between the items in FIG. 1. Invoice 150 in payer system 101 is received from payee system 102. Routing logic 104 is configured to receive invoice 150 and is coupled with escalation data 109, employee logic 111-113, transaction data structure 110, dispute logic 105, approval logic 106 and settlement/payment logic 107. Transaction data structure 110 is available to dispute logic 105. Employee logic 111-113 is coupled with display 103. Escalation data 109 is coupled with HR directory 108. Invoice 150 of payee system 102 is coupled with dispute logic 151. Dispute logic 105 and payer system 101 and dispute logic 151 of payee system 102 communicate via notifications 140. Settlement/payment logic 107 of payer system 101 communicates with settlement/payment logic 152 of payee system 102.

The following is a description of certain aspects of a transaction flow between payee system 102 and payer system 101 including the facilitation of the resolution of a dispute. An invoice 150 is sent from payee system 102 to payer system 101. The invoice is routed by routing logic 104 to various employees through employee logic 111-113. Such routing is carried out by invoice routing logic 117. In the event that an employee does not respond within a particular time or otherwise provide the appropriate response, the invoice is routed to another employee according to an escalation scheme stored in invoice scheme 125 of escalation data 109. Approval logic 106 facilitates approval and confirmation by employees of the invoice. In the event that an employee disputes an invoice, such dispute is handled by dispute logic 105.

Dispute logic 105 handles a variety of actions related to the dispute including editing the disputed portion of the invoice, chatting with the appropriate personnel at the seller regarding the disputed invoice, rejecting the invoice, canceling the invoice, finalizing the invoice and making a partial payment of the invoice. These functions are handled by edit logic 119, chat logic 120, reject logic 121, cancel logic 122, finalize logic 123 and partial pay logic 124 respectively. In editing the invoice, the user is able to make changes to the summary level information or to details in a line item where there is an error. For example, the user may change the quantity of a line item to reflect the correct quantity. In finalizing an invoice, the user causes the dispute regarding the invoice to end. The amounts and other details of the invoice are finalized according to the values determined by the buyer. After finalizing, the invoice, which may now have different values than the originally submitted invoice, is subject to approval and may be paid by the buyer. Additional approval is handled by approval logic 106. The invoice may be again disputed provided that it has not been subject to final approval. Approval may involve additional routing of the invoice by invoice routing 117 for appropriate approval by the respective employees (or other users) of the buyer. After final approval, the invoice is paid, and such payment is facilitated by settlement/payment logic 107.

If an employee does not respond regarding the dispute in a specified period of time, then the dispute may be escalated to another employee in the buyer's organization, such as the employee's manager, which can be the department manager of the original contract at the buyer, according to an established hierarchy. Such escalation is based on respective hierarchical data retained in an escalation level management scheme set forth in dispute scheme 126 of escalation data 109. The information and escalation data 109 is received from HR directory 108 according to an embodiment of the invention. Such information from HR directory 108 may be obtained from a human resource management system (HRMS) in one implementation. In some embodiments, an HR database located in a separate HRMS is employed. Such data is periodically updated from the HRMS of the organization. Such updates may occur periodically such as on a nightly basis. The respective invoice, dispute or payment is then escalated and routed to a manager of the employee who has not appropriately responded to the invoice, dispute or payment, according to the information regarding the manager of the employee in the FIRMS system. Similar routing and escalation may be performed based on other employee directory information, such as an employee directory.

Information regarding the transaction is stored in transaction data structure 110. Transaction data structure 110 makes information regarding the respective transaction available for use in approval, dispute resolution and payment. For example, the purchase order data 128 is available to be consulted during a dispute of the invoice through transaction data structure 110. Dispute history 131 is available for viewing by users in payer system 101.

Dispute logic 151 of payee system 102 includes accept logic 153 which receives notifications 140 from dispute logic 105 of payer system 101. Counter logic 154 allows the seller to enter a counter dispute. In the counter dispute, the seller provides indications as to aspects of the buyer's dispute that the seller disputes. For example, the seller may disagree with the exact correction made by the buyer but provide another figure different from the original figure provided by the seller. For example, if the original invoice was $200 for a line item, and the buyer made a correction to $100, the seller may provide a counter dispute in which the seller states that the correct amount is $150. The seller may also provide comments with the counter dispute explaining the reasons for the counter dispute.

According to the system described, the buyer can dispute an invoice at the summary or detail level, reject the invoice, cancel the invoice, modify the dispute, finalize the dispute and respond to a counter dispute from the seller. The buyer can take these actions through various employees or other users to whom the invoice and/or the dispute has been routed. The seller can respond to the buyer's indications regarding the dispute. The seller can accept the dispute or propose a counter dispute. According to one embodiment of the invention, the dispute is not finalized, and the buyer does not pay the invoice until the appropriate individuals at the buyer's organization have indicated that the dispute is finalized. According to an implementation, the buyer decides which corrections are made to the invoice when the invoice is finalized. The buyer can decide to accept the counter dispute of the seller, which may include corrections to the buyer's corrections, or the buyer can choose to finalize the invoice with other corrections. The seller may not agree with the buyer's finalization of the dispute. However, according to such an implementation, the invoice is finalized according to the values of the corrections accepted by the buyer.

The buyer can then pay the invoice after the dispute is finalized. After the dispute is finalized, the payer system routes the invoice for additional approval in the buyer's organization. The invoice may again be disputed if it has not been finally approved. After final approval, the invoice is paid. If the seller is still does not agree with the buyer's finalized invoice, the seller may re-invoice the buyer for the unpaid amount.

Figure 2:
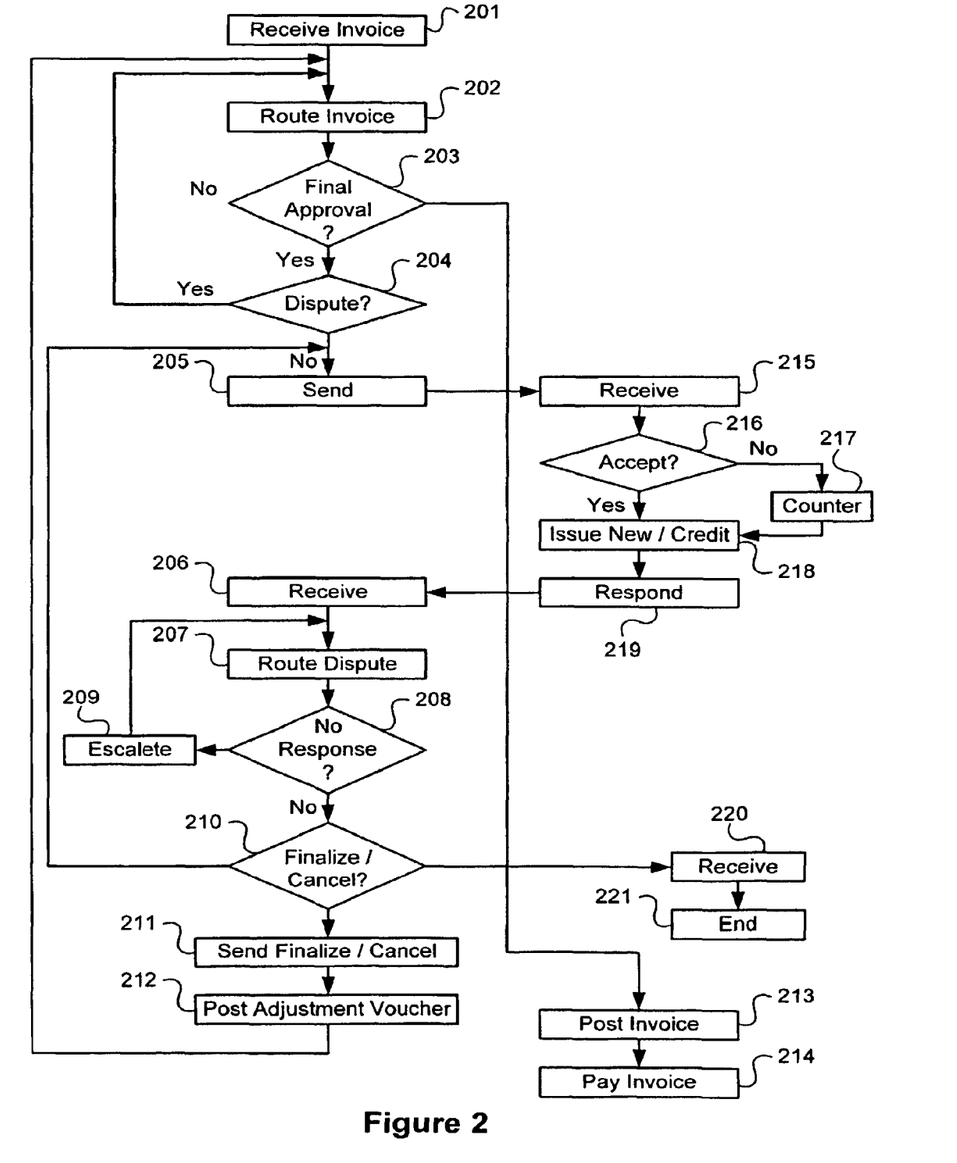
FIG. 2 is a flow diagram of a method to facilitate dispute resolution in electronic payment system according to an embodiment of the invention.

FIG. 2 shows a flow diagram of a method to facilitate dispute resolution in electronic payment system according to an embodiment of the invention. First an invoice is received (block 201). The invoice is routed to the appropriate personnel in the buyer's organization for approval (block 202). If the invoice has not been finally approved (block 203), then the invoice may be disputed. If the invoice is not disputed (block 204), it may be continued to be routed (block 202) until final approval.

If the invoice is disputed (block 204), then a notification is sent to the seller indicating that the invoice is disputed (block 205). The seller receives the indication that the invoice is disputed (block 215). Along with such indication may be transmitted corrections to the invoice and comments regarding the reasons for the dispute. If the seller does not accept the dispute (block 216), the seller may offer a counter dispute (block 217). If the seller accepts the dispute, the seller may then issue a new invoice or credit memo (block 218). The response, which includes the acceptance of the dispute or counter dispute, is then sent to the buyer system (block 219).

The buyer system receives the response from the seller (block 206). This response and any other information regarding the dispute is routed to the appropriate personnel in the buyer's organization (block 207). In the event that the appropriate personnel in the buyer's organization do not respond within a particular period of time (block 208), then the dispute is escalated to an appropriate other person in the buyer's organization (block 209). Such other individual in the buyer's organization may be a manager as determined by a database of managers or other structure, or may be an appropriate person in another department, such as the accounts payable (AP) department. After such escalation, the invoice continues to be routed to the appropriate person determined through the escalation (block 207).

If the dispute is not finalized or cancelled (block 210), then the dispute continues and notification of such continuation is sent to the seller (block 205) and is routed (block 207). If the dispute is finalized or canceled (block 210), then an appropriate notification is sent to the seller (block 211). The seller receives this notification (block 220), and the dispute process ends with respect to the seller's ability to respond (block 221) to notifications regarding the dispute, or according to another embodiment, to further process the dispute. After such finalization or cancellation, an adjustment is made to the invoice. Such adjustment may be made via an adjustment voucher (block 212) according to one implementation. Such adjustment may also be made in other ways, such as through other forms of correction to the invoice or the issuance of a new invoice. After the adjustment or correction to the invoice, if further routing is appropriate, the invoice is further routed until final approval occurs (blocks 202 and 203). An additional dispute may be started until final approval (block 204). After final approval without additional dispute, the invoice is posted to the ERP system for payment (block 213) and paid (block 214).

According to one embodiment of the invention, the system provides the buyer the option to partially pay the invoice. For example, where the buyer disputes one portion of the invoice but not another portion of the invoice, the system allows the buyer to pay the undisputed portion and continue to dispute the disputed portion of the invoice. For example, the buyer may dispute one line item in an invoice of four line items. The buyer in such situation may pay the portion of the invoice associated with the three undisputed line items and continue to dispute the disputed line item.

Different implementations of the communication between the buyer and seller regarding the invoice are possible. For example, the communication may be made through electronic notifications that are sent between the buyer and seller systems. Such notifications may be made in the form of electronic mail messages. According to one embodiment of the invention, certain notifications between the buyer and seller regarding the dispute are digitally signed. Such digital signatures help in preventing repudiation by the respected party that is signing the document. According to one implementation of the invention, the notification from the seller indicating that the seller accepts the buyer's dispute is signed by the seller. The seller system provides for such a digital signature by the seller and forwards the digitally signed notification to the buyer's system. According to another embodiment of the invention, the finalization of the dispute by the buyer is digitally signed by the buyer. The buyer's system accepts such digital signature from the appropriate personnel at the buyer organization and forwards the appropriate notification with the digital signature to the seller's system.

The digital signature may be implemented in various ways. For example, according to one implementation, the digital signature is accomplished through a public key/private key scheme. In one implementation of this, the respective party assigns the notification using its private key, and the other party authenticates the digital signature using the corresponding public key.

Figure 3:
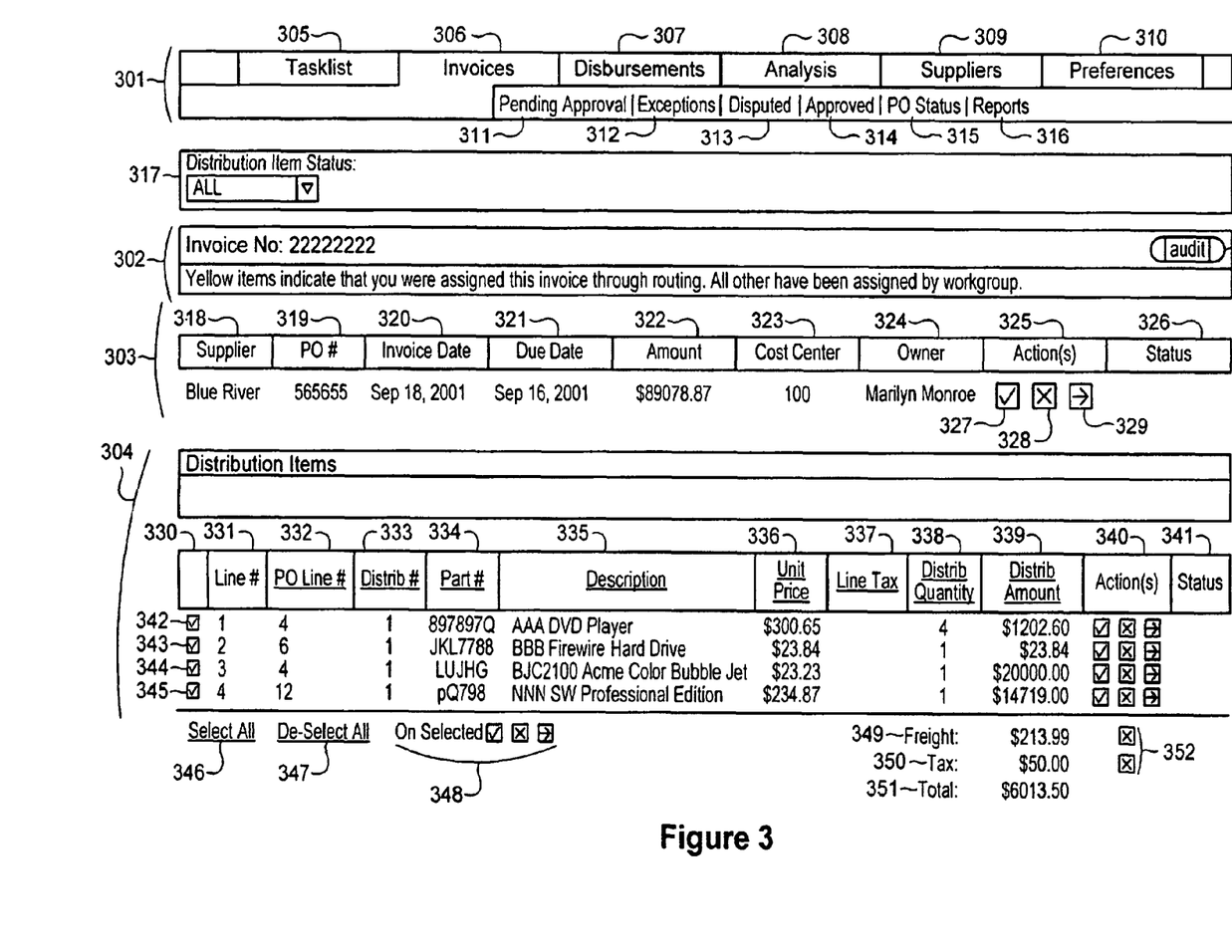
FIG. 3 is a user interface with inputs to facilitate dispute resolution according to an embodiment of the invention.

FIG. 3 shows information regarding an invoice including summary information and details. The user interface allows the user to dispute various items in the invoice at both the summary level as well as the specific details in the invoice. The user interface includes menu bar 301, invoice header 302, summary data 303, detail data 304 and totals 349, 350 and 351. Also included are selections 346 and 347 and distribution items status selection 317. Menus 301 include task list 305, invoices 306, disbursements 307, analysis 308, suppliers 309 and preferences 310. Sub-portion invoices 306 includes pending approval 311, exceptions 312, disputed 313, approved 314, purchase order status 315 and reports 316.

Invoice header 302 includes the invoice number and audit selections 353. The summary data includes suppliers 318, purchase order number 319, invoice date 320, due date 321, amount 322, cost center 323, owner 324, actions 325 and status 326. Details 304 include selection 330, line number 331, purchase order line number 332, distribution number 333, parts number 334, description number 335, unit price 336, line tax 337, distribution quantity 338, distribution amount 339, actions 340 and status 341. Along with tax 349 and freight 350 are buttons allowing for dispute of these items 352.

The user interface allows for a user, for example, as an employee of the buyer, to dispute various aspects of the invoice. The user can dispute the entire invoice through the buttons under actions 325 at the summary level 303. The user can either approve (button 327), reject in its entirety (block 328) or forward to another user (block 329) the invoice by selecting the appropriate buttons at summary level 303. According to one implementation of the invention, the user has the ability to reject the invoice in its entirety by selecting the appropriate button or, in another implementation, to dispute the invoice in its entirety. When the user disputes the invoice at the summary level, an appropriate notification is sent to the seller and the invoice is in a disputed state.

The user can also dispute the particular details of the invoice. For example, in detailed display 304 the user can dispute a line item by taking the appropriate action available in column 340. The check box allows for approval of the item, and the 'X' allows for the user to dispute the particular line item. The arrow in column 340 allows the user to forward the line item to another user. By selecting particular items using selection in column 330, the user can then take an action such as accepting, disputing or forwarding respective selected items as a group through choosing the appropriate check, 'X' or arrow button among buttons 348. Detailed items in 304 include lines 342, 343, 344 and 345. These items may be individually disputed, approved or forwarded.

Figure 4:
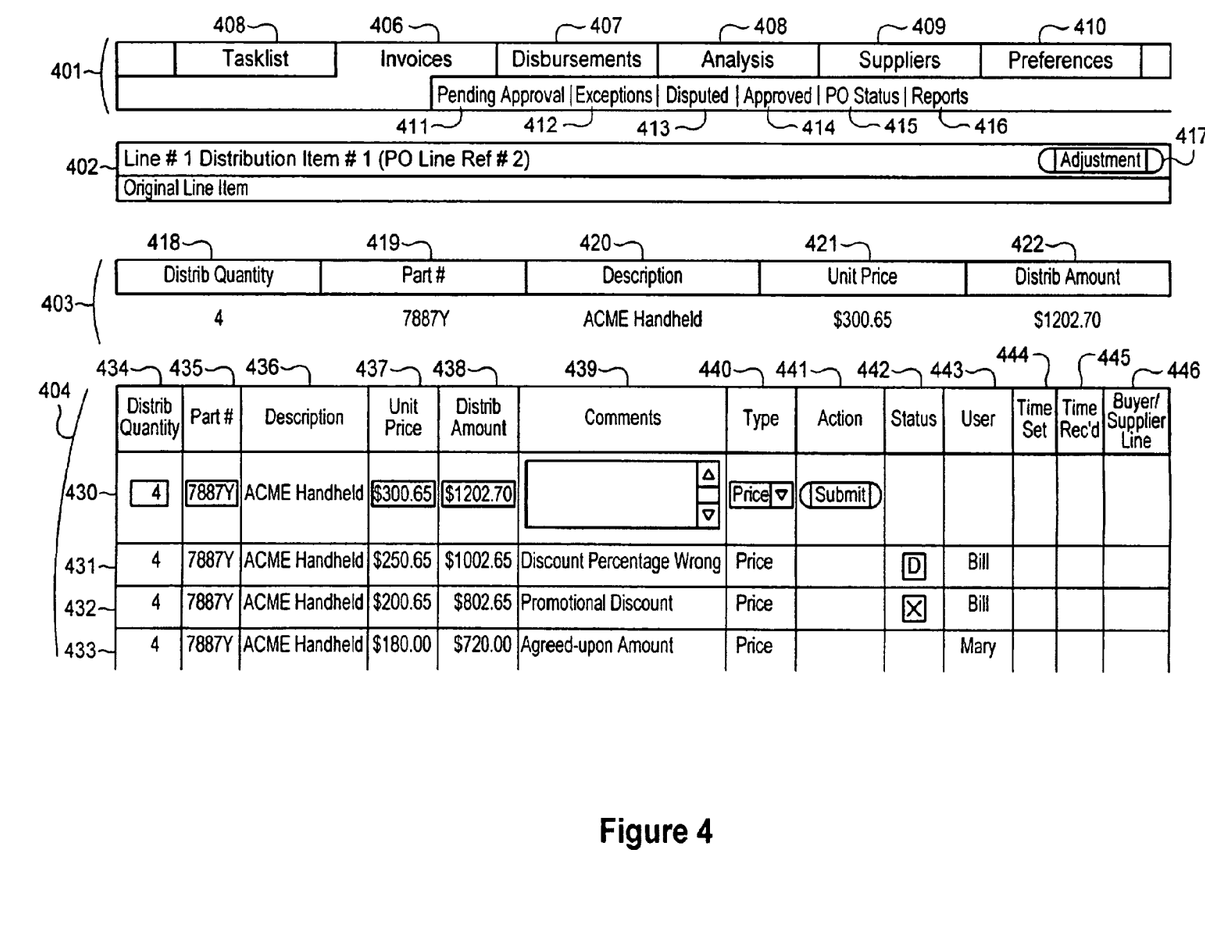
FIG. 4 is a user interface in an electronic payment system for entering a dispute-related information according to an embodiment of the invention.

FIG. 4 shows a user interface in an electronic payment system for entering a dispute-related information according to an embodiment of the invention. The user interface shown in FIG. 4 includes menus 401, header 402, summary 403 and details 404. Menu 401 includes task list 408, invoices 406, disbursements 407, analysis 408, suppliers 409 and preferences 410. Invoices 406 include pending approval 411, exceptions 412, disputed 413, approved 414, purchase order status 415 and reports 416. Summary 403 includes distribution quantity 418, party number 419, description 420, unit price 421 and distribution amount 422. Details 404 include rows 430, 431, 432 and 433 and the following columns: distribution quantity 434, part number 435, description 436, unit price 437, distribution amount 438, comments 439, type 440, action 441, status 442, user 443, time sent 444, time received 445 and buyer/supplier unit 446.

The user interface allows for the buyer user to add detailed corrections to the disputed invoice. These corrections are made in line 430. The corrections include corrections to specific items such as number for distribution quantity 434 as well as comments regarding the dispute 439. Included in the other rows of the details 404 are other entries which form the history of the dispute. These other entries include entries made by other users as shown by user column 443.

According to one embodiment of the invention, the user can dispute various items of invoice data. For example, the user can dispute and provide updated, corrected information for the total invoice amount, the total tax and the total freight charges for the invoice. At the more detailed level, the user can dispute and enter corrected amounts for the quantity, unit price, amount, SKU and tax for respective line items in the invoice. A line item typically represents the charge in the invoice for a product.

According to one implementation, the user can enter a code that indicates the reason for the dispute. Such code may be selected from a pre-defined set of reason codes including:
  the price exceeds the order;
  the quantity exceeds the order;
  tax is not applicable to this item;
  the item was not ordered;
  the goods are unsatisfactory.

Additionally, the user can enter a free form explanation as to why the item is disputed. Subsets and supersets of these reasons may be provided to the user at the buyer's organization for selection and submission to the seller according to different embodiments of the invention.

The user from both the buyer and the seller can view history of the invoice and history of the dispute regarding the invoice. Certain information regarding the history is available only to the users from one particular organization. For example, information regarding the particular users who dispute a data item and internal comments regarding the invoice may be available to only the buyer's organization. According to another implementation, other data is available to only individuals in the seller's organization. The historical information regarding the dispute includes:
  the user who entered the dispute data;
  the date the dispute was entered;
  the date the dispute was sent or received;
  the status of the dispute—open or closed; or
  a sub or super-combination of the above items.

Multiple users can use the history of the dispute and participate in comments and actions on the dispute. Certain aspects of this information regarding the history of the dispute may be available to only the buyer or the seller's organization.

Figure 5:
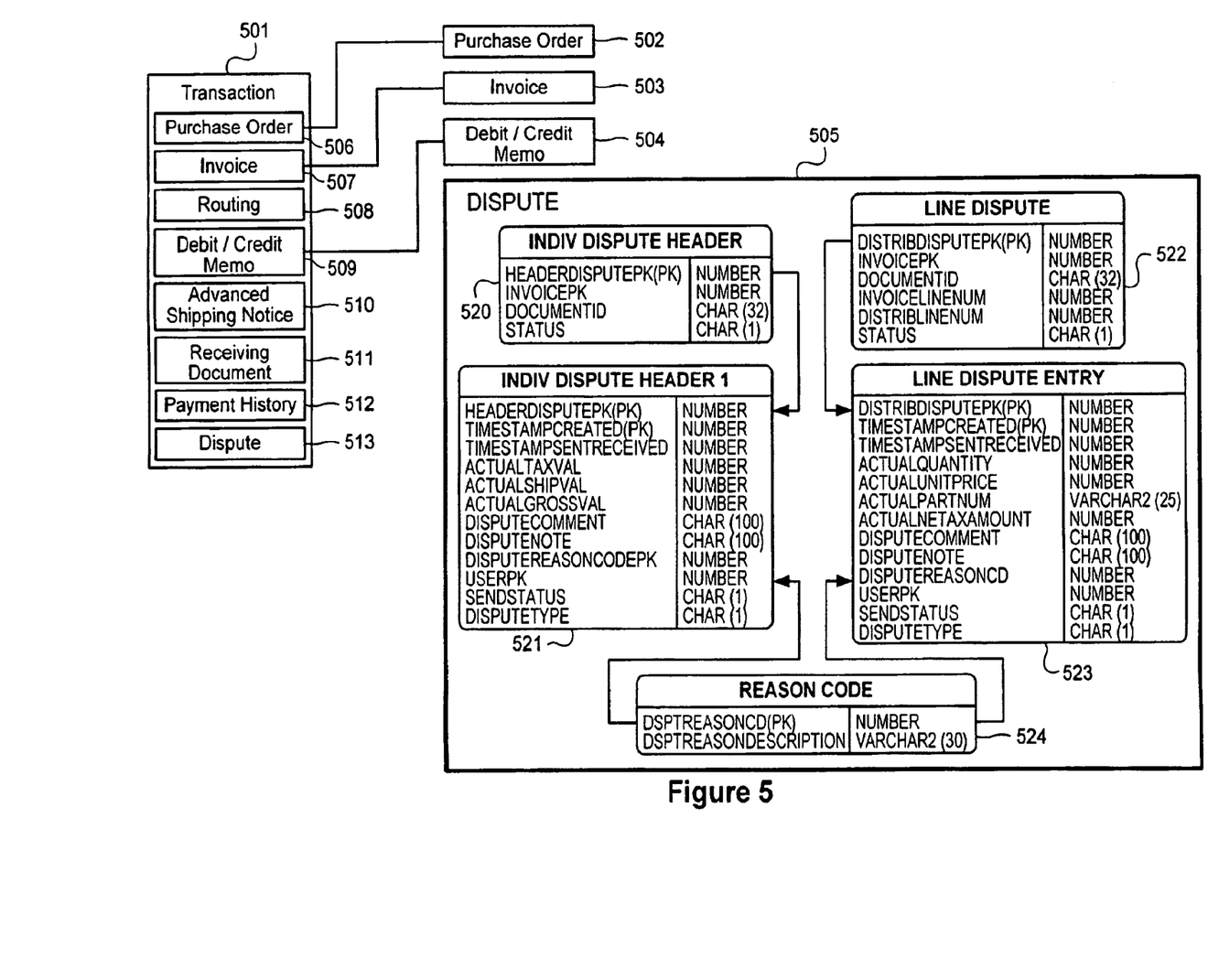
FIG. 5 is a block diagram of a data structure related to a transaction and dispute resolution to an embodiment of the invention.

FIG. 5 shows a block diagram of a data structure related to a transaction and dispute resolution to an embodiment of the invention. The data structure includes a transaction structure 501. Transaction structure 501 includes purchase order 506, invoice 507, routing history 508, debit/credit memo 509, advanced shipping notice 510, receiving document 511, payment history 512 and dispute 513. These respective items may be implemented as pointers or links to the respective documents. For example, purchase order 506 is linked to purchase order document 502. Similarly, invoice 501 is linked to invoice document 503, and debit/credit memo 509 is linked to debit/credit memo 504. Dispute information is contained in a dispute schema 505, which is linked with dispute 513. The dispute schema 505 includes dispute header structure 520, dispute header detail structure 521, line item structure 522, line item entry structure 523 and reason code 524. Dispute header structure 520 includes a link to the invoice, a document identification and a status. Dispute header detail structure 521 includes a link to the dispute header, a time created stamp, a time sent and received stamp, and actual tax value, an actual ship date value, an actual gross value, a comment, an internal note, a dispute reason code, a link to the user, a status and a dispute type. The item detail in structure 521 is information regarding the invoice general level dispute entered by a particular user. The line item structure 522 includes a link to the invoice, a document identification, an invoice line number, a distribution line number and a status. The individual line item detail structure 523 includes information a particular entry made by a particular user. This structure includes a time created, a time sent and received, an actual quantity, an actual unit price, an actual parts number, an actual net tax amount, a comment, an internal note, a reason code, an identification of the user, a status, and a dispute type. The reason code for the dispute 524 includes a dispute reason code and a description of the dispute.

The records in dispute structure 505 help to maintain the history of the dispute at the general level and line item level and keep track of actions on the dispute by different respective users. The items shown may be implemented in various in sub-combinations and super-combinations according to different implementations of the invention. The dispute structure 520 helps to organize the overall history of the dispute and the dispute summary detail structure 521 helps to keep track of entries in the dispute at a summary level made by a particular user. The dispute line item structure 522 helps keep track of entries in the dispute with respect to a particular line item, and the dispute line item details structure 523 helps keep track of entries with respect to the particular line item made by a particular user, and in one implementation, each entry made by the particular entry at a particular time.

The transaction structure 501 helps keep track of information related to the transaction for dispute, routing, payment and other purposes. For example, the system uses transaction record 501 to find the documents associated with a particular transaction, such as the invoice, purchase order and payment history. One example of an advantage of the transaction structure 501 is it helps the system to find the original purchase order information and compare such information with the invoice to determine if there are any discrepancies. According to one embodiment of the invention, this information is available in the dispute.

Figure 6:
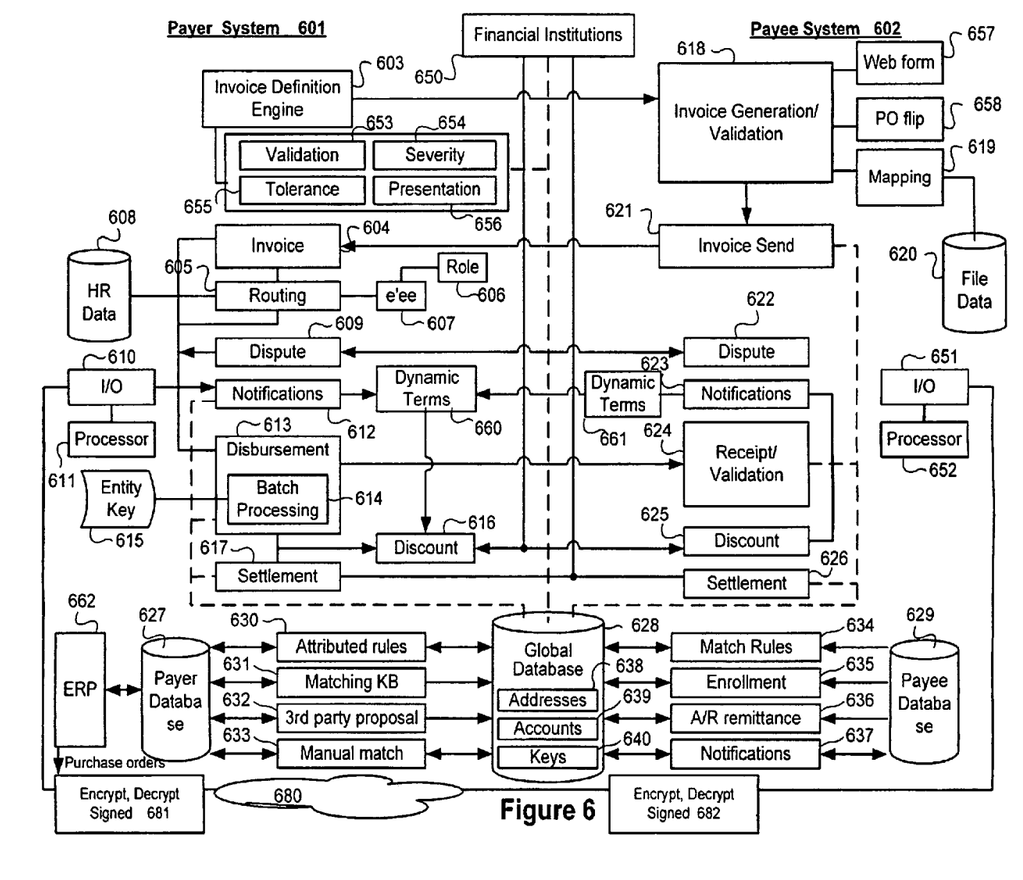
FIG. 6 is an electronic payment system according to an embodiment of the invention.

FIG. 6 is a block diagram of a system according to an embodiment of the invention. The system allows a paying entity to define the invoice format for invoices it wishes to receive. The system facilitates routing, editing, dispute resolution, and disbursement of payment. The system includes payer (buyer) shown as 601, payee (vendor) shown as 602, and financial institutions shown as 650. The system has the following characteristics according to one implementation: collaborative network model, A/P (buyer) centric enterprise software, plugging into existing ERP systems, full cycle bill-to-pay functionality, web-based A/R (vendor) software, and co-existence with the customer existing bank relationships.

The collaborative network model supported by the unique collaborative vendor reconciliation engine between global directory shown as 628 and A/P centric master vendor list shown as 627. The reconciliation engine provides methods of matching existing vendor name/address with self enrolled vendor information in the global directory. These methods include: fuzzy attributed weight based matching shown as 630, previous vendor histories of matching in the knowledge based shown as 631, third party outsourced recommended matching proposal shown as 632, and manual interactive selection from buyers shown as 633. Each vendor is represented by several critical attributes in the global directory: addresses shown as 638, real and alias accounts shown as 639, and keys shown as 640. Vendor entries are pre-populated with information uploaded from the buyer ERP system. The vendor enrolls via the online self-service enrollments 635. Vendor also provides additional rules to match 634, A/R remittance format attributes 636, and notification rules/addresses 637.

Accounts payable (ALP) buyer-centric enterprise software associated with payer system 601 includes several key unique functions. These functions include buyer defined electronic invoice exchange, routing/editing and approval, and dispute resolution. Payer system 601 includes invoice definition engine 603, invoice 604, HR organization data 608, routing/editing logic 605, dispute logic 609, notifications logic 612, disbursement logic 613, dynamic terms logics/offers 660, discount logic 616 and settlement logic 617. Also included on payer system 601 are input output (I/O) 610, processor 611, entity key 615, and payer central repository database 627. The invoice definition engine 603 includes validation logic 653, tolerance/replacement items 655, interaction severity 654, and several presentation forms 656. This definition engine is controlled by payer helps provide clean invoice data from payees. The definition logics (653, 654, 655, and 656) can be configured to specific payee or a specific group of payees.

Invoice definition engine 603 and its definition logics are exposed to payee via global directory and are operative with invoice definition/generation/validation 618 of payee system 602. The routing/editing logic 605 includes business logic that governs how an invoice will be processed by AP clerks, and what data entry information will be required to complete the transaction. Routing/editing logic 605 can operate differently based on multiple attributes: document type, document value, discount value, etc. Routing/editing logic 605 acts on HR organization database 608 to define routing/editing/approval work flow based on employee information 607 and role values 606. Invoice 604 is coupled into routing logic 605. Routing logic 605 is coupled with employee logic 607 and role assignment 606. Routing logic 605 is coupled with HR data 608 and with dispute logic 609, notifications logic 612 and disbursement logic 613 of payer system 601. Notification logic 612 is configured by the payer, and includes collaborative filtering, and mappings status and notification definitions between internal to external payees. These collaborative filtering and mappings can be designated to a payee or a group of payees.

Dispute logic 609 is set of payer defined centric collaboration rules and interactions between payer and payee to resolve issues related to invoice or other exchanged documents. Some disputes are simple (e.g., number of items is received, etc.) while others are more complex (e.g., replacement items do not meet part specification and price). The outcomes of a dispute are partial payments, partial invoices, new invoices, or other outcomes. According to one implementation, a dispute can only be finalized by payer and its members, and some finalized exchanges will require digital signature to ensure non-repudiation. The payer dispute logic 609 orchestrates with payee dispute logic 622. Payer dispute logic, references, and history are stored in payer central repository 627.

A/R web based centric software associated with payee system 702 helps provide an online self-service payee system. Payee system 702 includes a processor 652 and input/output (I/O) 651. Such processor 652 and input/output 651 allow for communication with other entities such as payer system 601, financial institutions 650 and global database 628. Processor 652 and processor 611 of payee 602 and payer 601 respectively may run various software processes to implement the logic shown. The processes may be implemented as software objects, routines or other software processes, programs or implementations. Alternatively, portions of such logic may be implemented in hardware logic or other forms of logic. The functions shown may alternatively be implemented on a common server or in a distributed set of computer systems separated over a computer network, or other configuration that achieves the logical functions shown.

Data and information such as for global database 628 may be stored in data structures or other data format and stored in computer memory, fixed storage or other data storage or archived in various implementations of the invention.

Payee system 602 includes invoice generation/validation logic 618, invoice send logic 621, dispute logic 622, notifications logic 623, receipt/validation logic 624, discount logic 625 and settlement logic 626. Invoices or other documents can be submitted to payer via multiple mechanisms. Three sample mechanisms are shown here: Web forms shown 657, purchase order pre-populated invoice (PO flip) 658, and electronic file submission via file mapping 619. The Web forms 657 are a set of payer defined presentations that can be selected and/or authorized to be used by payee(s). Payee can also define additional payee private attributes and fields to be used during A/R matching as well as graphic materials (such as company logo, etc.). The PO flip 658 uses information from purchase orders which are transmitted to payee from payer to pre-populate the invoice data. The status of each purchase order is maintained within the payee central repository to support blanket purchase orders. File mapping 619 is used by the payee to automate the bulk invoice submission process. Normally, these file are exported from payee's A/R system. The mapping defines how payee's data will be mapped into payer, as well as default/validation/transformation rules. Upon submission of these invoices or other documents via multiple mechanisms (657, 658, 619). The documents are validated based on the payer definition engine 618. This definition engine 618 includes payer definition engine 603 and its components: validation 653, severity 654, tolerance 655 and presentation 656.

Invoice generation/validation logic 618 is coupled with mapping logic 619 in communication with file data 620. Invoice generation/validation logic 618 is coupled into invoice send logic 621. Dispute logic 622 is coupled with dispute logic 609 of payer system 601. Notifications logic 623 is in communication with notifications logic 612 of payer system 601 and discount logic 625 of payee system 602. Receipt/validation 624 of payee system 602 is in communication with disbursement module 613 of payer system 601. Settlement logic 626 is operative with discount logic 625 of payee system 602 and receipt/validation logic 624.

Global database 628 is available to notifications logic 612 and 623, disbursement logic 613, settlement logic 617 and 626, invoice send logic 621, receipt 621 and receipt/validation logic 624. Global database 628 is in communication with payer database 627 through attribute match rules 630, knowledge based history matching samples 631, third party recommendation/proposal 632 and manual interactive matching by payers 633. Global database 628 is in communication with payee database 629 through match rules 634, enrollment logic 635, remittance formats 636 and notification preferences 637. Global database includes items such as address 638, accounts 639 and public keys 640. Payer database 627 is located with payer system 601 and payee database 629 is located with payee system 602. Global database 628 is also available to financial institutions 650.

Through invoice definition engine 603 a payer uses payer system 601 to define the invoice that the payer wishes to receive. Such definition helps to increase efficiency in the payer system because the resulting invoice from the payee, such as a seller, is more likely then in the proper data format when it is received. Payee system 602 generates an invoice based on the defined invoice in invoice generation/validation logic 618. The input data for the invoice is validated based on the invoice definition rules defined in payer system 601. If file data is used to automatically map into an invoice, such mapping is performed in one embodiment of the invention by mapping logic 619. Mapping logic 619 receives the file data 620 with information to be populated into respective invoices. File data 620 may contain files with data for invoices for various payers who have purchased good or services from the payee. When an invoice is completed it is sent through invoice send logic 621 to payer system 601. Additional information regarding definition of invoice by the buyer and use of related invoice rules is contained in United States patent application entitled System and Method for Electronic Payer (Buyer) Defined Invoice Exchange, application Ser. No. 10/155,840, which is incorporated herein by reference in its entirety.

More particularly, a set of rules for accepting information into a document is received from the buyer. An invoice definition engine presents a user of payer system with the opportunity to define the format of the invoice and create a corresponding set of rules. According to one embodiment of the invention, rules may include requirements for validation of information for respective fields of the invoice. For example, a buyer may create a definition for communication with the buyer that includes rules for data validation, extraction of information from the buyer's systems (such as the buyer's enterprise resource planning system), transformation of status information and other processing.

In one example of use of an embodiment of the invention, a buyer first defines the format by which it receives data, the presentation format provided to sellers and the addresses to which goods and billing are sent. A seller logs on to its system to send an invoice to the buyer and is presented with an interface formatted according to the buyer's presentation definition. The seller enters information into the invoice creation interface and receives responses based on the data definition defined by the buyer.

The invoice rules include the set of fields, as well as a set of validation rules which determine whether particular information input into respective fields is acceptable according to the invoice definition. Invoice rules include tolerance which determines whether particular information for a particular field is acceptable based on, in one implementation, a range of values. For example, a tolerance of a range of values around a purchase order value may be set such that a price is not acceptable if it is not within the range. According to one embodiment of the invention, the rules include whether the information is within a particular range of values from corresponding fields in a purchase order under which items associated with the invoice were ordered. Field rules include various field rules for the field. For example, according to one embodiment of the invention field rules include a field identification, validation type, visible flag, editable flag, required flag, version flag, format designation and severity flag. According to one embodiment, the ranges may include a price tolerance.

A severity rule determines, depending on the selected severity, how a violation of the rule is treated. For example, the severity may be set such that when a value for the field is not acceptable, the invoice is not allowed to be completed. Alternatively, severity may be set such that when the value for the expective field that is attempted to be input is not acceptable, a warning is provided to the user at the payee system but the data is nevertheless accepted. Presentation rules determine the format of presentation of the respective invoice. For example, certain information may be provided only to certain groups of sellers.

In some embodiments, a purchase order of the buyer may be converted into an invoice, according to an invoice definition defined by the buyer.

An invoice is received at payer system 601 as shown here with invoice 604. The invoice is routed to the respective employees or other agents for its review and approval. Some approval may require additional signatures according to one embodiment of the invention. As shown here, employee logic 607 is in communication with routing logic 605 to allow an employee to authorize, audit or view respective invoice or check information.

Routing logic 605 is also used to route checks or other documents to various employees for signature or approval using HR data 608. Routing logic 605 uses HR data 608 to determine the correct employees to whom to route the respective document, such as in an invoice or check. Routing may be made to the manager of a respective employee if the employee has not responded in a certain time to the document. Such the choice of such manager to whom to route is made based on the management hierarchy in the organization stored in HR database 608. Such database is extracted from a human resource management system (HRMS), in one implementation of the invention. Additional information regarding routing of documents in the system is described in United States patent application entitled Method and System for Invoice Routing and Approval in Electronic Payment System, application Ser. No. 10/155,853, which is incorporated herein by reference in its entirety.

A user of payer system 601 may dispute an invoice or other payment request through dispute logic 609. Dispute logic 609 is in communication with dispute logic 622 of payee system 602. This allows for communication regarding a dispute between a payer and a payee. The dispute may be only initiated and finalized by a payer. According to one embodiment of the invention, the dispute may be finalized only by the buyer, or the payer system. The dispute includes the capability to indicate that particular items in an invoice are disputed, such as the tax. The dispute logic 609 and 622 include the capability for individuals using the payer system 601 using payee system 602 to engage in a chat dialog.

Notifications logic 612 communicates completion of various stages of approval or other issues of status regarding invoices and disbursement. For example, when an invoice is approved notifications logic 612 communicates a notification to notifications logic 623 of payee system 602. Based on such notifications, a discount may be enabled through discount logic 616, which is in communication with discount logic 625 of payee system 602. For example, where an invoice is approved, a discount may be enabled based on an agreement or outstanding dynamic terms offers shown as 660 that the corresponding payment is made earlier than required under the original terms and conditions. Dynamic terms are additional real-time terms, a set of rules, and/or goal seeker that are established by payer 660 or payee 661. These dynamic terms rules 660 and 661 are based on business event types (invoice approval, purchase order approval, etc.), a payee or group of payee and a set of new discrete or variable terms. These dynamic term goal seekers allow payer and payee to set desirable outcomes. These dynamic terms can be pre-negotiated up-front or in real-time based on business event types. The approval of these new terms may require digital signature of either payer or payee. Also, third party financial institutions could be involved to provide funding for payee in returns for early discounts. For additional information regarding discounts facilitated by the system, dynamic terms (660 and 661) and discount logic 616 and 625 please refer to US patent application entitled System and Method for Varying Electronic Settlements between Buyers and Suppliers with Dynamic Discount Terms, application Ser. No. 10/155,806, which is incorporated herein by reference in its entirety.

To facilitate complete bill-to-payment functionality, the system in FIG. 6 includes disbursement logic 612 and settlement logic 617. Disbursement logic 613 includes all payment routing, signing, and approval logic for respective invoices or other requirements for payment. Some payments will require multiple signatures to be signed based on payment amount and/or destination payee(s). Digital signatures and nondigital signatures may both be used. Also, payer can configure to control new settlement date for the payment by defined payee group and number of business/calendar days to be adjusted. The disbursement logic also includes auditing capability with multiple levels based on number of signatures and/or amount. In one implementation, disbursement logic 613 makes such disbursement in the form of electronic checks in one implementation. Such electronic checks are generated and signed with a digital signature. The digital signature may be obtained from respective users such as through a routing process using routing logic 605 to obtain a signature from employee logic 607 with role assignment digital key 606.

Alternatively, a set of instructions may be received to send a set of checks that use a digital signature of the payer organization rather than the digital signature of an employee. Such check processing may be accomplished through batch processing logic 614 and disbursement logic 613. Such batch processing logic 614 uses an entity key 615, which is a private key of the payer's organization. Batch processing logic 614 requires particular authorization for the respective instruction. The authorization may require that the agent requesting the set of checks sign the instruction with the agent's private key. Receipt/validation logic of payee system 602 is in communication with disbursement logic 613. Receipt/validation logic 624 receives payment, such as in the form of electronic checks. Such electronic checks are validated to assure that they are accurate. Receipt/validation logic decrypts any encrypted documents, for example if the electronic checks are encrypted with the public key of payee system 602, such checks are decrypted. Additionally, the digital signature of the sender is authenticated in receipt/validation logic 624. Such authentication is accomplished using the public key of the payer, which corresponds to the private key of the payer's organization (entity key 615) that was used in batch processing logic 614 (entity key 615). Additionally, verification may be made against a payment database generated by the payer system when the checks are created in order to assure that the checks were actually sent by the payer system. Additional information regarding disbursement 613 and batch processing 614 is contained in United States patent application entitled System and Method for Electronic Authorization of Batch Checks, application Ser. No. 10/155,800, which is incorporated herein by reference in its entirety.

Settlement logic 617 allows for settlement of payment between a payer system 601 and payee system 602. Settlement mechanism includes exiting combination of paper based checks, standard domestic electronic payment network (Fed Wire, ACH, CHIPS, etc.), international electronic payment networks (SWIFT, Bolera, etc.), propriety private payment networks (VISA, MasterCard, and American Express, etc.), and internal account bank transfer (On-us, etc.) For example, settlement may be made through debits and credits in a database within the system. Alternatively, settlement may be performed through an external network such as the ACH network with financial institutions involved, such as financial institutions 650.

Settlement logic 617 supports standard fund transfer model (buyer's account will be debited and supplier's account will be credited.) and good funds model (buyer's account will be debited and a temporary account will be credited. Upon receiving fund availability in temporary account, the supplier will be credited). Settlement logic 617 is implemented via issuing requests to the settlement network. Such request can be file-based requests such as ACH or transactional request such as VISA networks. For each request, there will be associated confirmation ID to ensure the trace ability of each transaction.

Global database 628 is available for use by elements that send payment, such as disbursement logic 613 and settlement logic 617. Global database 628 is also available for elements that send other documents or information between payees and their respective financial institutions. For example, invoices may be sent based on the respective recipient address as stored in the global database 628. Thus, invoice sends logic 621 is in communication with global database 628.

Global database 628 includes addresses and account information for respective payers and payees who use the system. Links are created between items in the global database and other databases in order to allow for the global database to be updated and the corresponding linked information to continue to be used. Thus, for example, according to one embodiment of the invention, a payer has a separate database, payer databases 627, and matches are created between items, such as addresses or payment entities and payer 627 and respective items in global database 628 through a match generation process 630. Such matched generation process 630 may include providing a user of the payer system 601 with a series of candidate matches between addresses stored on payer database 627 and corresponding spellings of addresses or payment entities in global database 628. The user of payer system 601 is then able to select the best match and create a link between the respective address or payment identification.

This link can then later be used to effect payment to the proper address as stored in the global database. Similarly, a match generation between items in payee database 629 and global database 628 can be performed so that payee system 602 can send items to the proper recipient using information in global database 628. Enrollment logic 635 is available to enroll new entities as payees into the global database to make them available for use by payer system 601 or payee system 602.

The links established are then available to allow for use of information in the respective payer database 627 and payee database 629 in order to find recipients to whom documents or payments are to be sent. In addition to address information 638 and account information 639, according to one embodiment of the invention, public keys of various participants in the systems are stored in the global database 628. Such keys are then available to for use in order to determine the accuracy of a digital signature sent by a particular entity. Additional information regarding global database 628 and related logic and communication is contained in the United States Patent Application entitled Method and System for Collaborative Vendor Reconciliation, application Ser. No. 10/155,797, which is incorporated herein by reference in its entirety.

In the FIG. 6 system, invoices and other documents are exchanged between payers and payees over the public and internet networks 680. To help provide security and privacy, before they are sent, invoices and other documents are signed with source private key, and encrypted with destination public key shown as 681. Upon receiving invoice or other document, the document is decrypted with its own private key, and validated against source public key to ensure non-repudiation shown as 682.

The system also can integrate with multiple enterprise resource planning (ERP) systems shown as 662. Such ERP systems include: PeopleSoft, SAP, Oracle Financials, etc.

The system will integrate with these ERP systems via native and/or standard interfaces. An example of native interface for PeopleSoft is Message Agent, etc. The interfaces include EDI gateway, etc. The system utilizes the ERP to extract documents (purchase orders, invoice status, unit of measurements, vendor list, etc.), to post documents (invoices, vendor information, status, etc.).

The foregoing description of various embodiments of the invention has been presented for purposes of illustration and description. It is not intended to limit the invention to the precise forms described.

What is claimed is:

1. An electronic payment system, comprising:
a server associated with a buyer's organization, the server associated with the buyer's organization including:
logic that receives an electronic invoice from a seller, the electronic invoice being subject to invoice definition rules for accepting information into the invoice as defined by the buyer's organization, the invoice definition rules including rules for the format by which the invoice receives data, validation of information for respective fields of the invoice, extraction of information from the buyer's organization's systems, and transformation of status information;
logic that electronically routes the invoice to individuals in the buyer's organization;
logic that receives from a set of two or more of the individuals in the buyer's organization indications that the invoice is disputed, corrections to disputed portions of the invoice, comments for the seller regarding the disputed portions of the invoice and comments for other individuals in the buyer's organization regarding the invoice;
logic that forwards to a server associated with the seller an indication that the invoice is disputed, the corrections to the disputed portions of the invoice and the comments for the seller, without forwarding the comments for other individuals in the buyer's organization;
logic that automatically forwards information regarding the dispute to another individual in the same organization as a first individual responsible for responding to a notice regarding the dispute if the first individual has not responded within a particular time, the another individual being a manager of the first individual, the manager being determined according to an established hierarchy based on hierarchical data retained in an escalation level in management scheme obtained from a human resource management system (HRMS);
logic that withholds payment for the invoice until an indication from the buyer's organization has been received that the buyer's organization has determined that the invoice may be paid; and
logic that displays a history of the dispute to individuals in the buyer's organization on request, the history including indication of users who entered dispute data, the indication of users who entered dispute data being made available only to the buyer's organization;
a server associated with the seller, the server associated with the seller including:
logic that receives from the server associated with the buyer's organization the indication, the corrections and the comments; and
logic that receives from the seller a response to the buyer's organization indication, the response including an acceptance of changes suggested by the buyer's organization or an indication that the seller disputes the changes suggested by the buyer's organization.

2. The system of claim 1, the system associated with the buyer's organization further comprising:
logic that, in response to selection by the buyer's organization, forwards to the server associated with the seller a code identifying the reason for the dispute, the reason including:
price exceeds order;
quantity exceeds order;
tax is not applicable;
a respective item was not ordered; or
goods ordered are unsatisfactory.

3. The system of claim 1, wherein the history further includes:
date dispute data was entered; and
date dispute was sent or received.

4. The system of claim 1, further comprising forwarding corrections to the seller, in response to selection by the buyer's organization, to:
a line item of the invoice;
total tax in the invoice;
tax for a line item in the invoice;
freight charge in the invoice;
quantity in the invoice;
unit price in the invoice; or
SKU identified in the invoice.

5. The system of claim 1, further comprising:
logic that facilitates a chat session between the server associated with the buyer's organization and the server associated with the seller.

* * * * *